US012446955B2

(12) United States Patent
Howard et al.

(10) Patent No.: US 12,446,955 B2
(45) Date of Patent: Oct. 21, 2025

(54) VARIABLE IMPEDANCE PATHS FOR DELIVERY OF ELECTRIC FIELDS

(71) Applicant: Medtronic, Inc., Minneapolis, MN (US)

(72) Inventors: Brian T. Howard, Minneapolis, MN (US); Steven J. Fraasch, Maple Grove, MN (US); Gonzalo Martinez, Mendota Heights, MN (US); Mark T. Stewart, Lino Lakes, MN (US); Sara A. Frantz, Mounds View, MN (US); Lars M. Mattison, St. Anthony, MN (US)

(73) Assignee: Medtronic, Inc., Minneapolis, MN (US)

(*) Notice: Subject to any disclaimer, the term of this patent is extended or adjusted under 35 U.S.C. 154(b) by 878 days.

(21) Appl. No.: 17/683,635

(22) Filed: Mar. 1, 2022

(65) Prior Publication Data

US 2022/0280229 A1    Sep. 8, 2022

Related U.S. Application Data

(60) Provisional application No. 63/156,540, filed on Mar. 4, 2021.

(51) Int. Cl.
*A61B 18/14* (2006.01)
*A61B 18/12* (2006.01)
(Continued)

(52) U.S. Cl.
CPC ...... *A61B 18/1492* (2013.01); *A61B 18/1206* (2013.01); *H03H 1/00* (2013.01);
(Continued)

(58) Field of Classification Search
CPC .... H03H 1/00; A61B 18/1206; A61B 18/1492
See application file for complete search history.

(56) References Cited

U.S. PATENT DOCUMENTS

2009/0264792 A1* 10/2009 Mazar ............... A61B 5/0006
600/547
2013/0102920 A1*  4/2013 Fan ................. A61B 5/053
600/547

(Continued)

OTHER PUBLICATIONS

International Search Report and Written Opinion for Application No. PCT/IB2022/051882 dated Jun. 1, 2022 (14 pages).

*Primary Examiner* — Linda C Dvorak
*Assistant Examiner* — Ryan T Clark
(74) *Attorney, Agent, or Firm* — Michael Best & Friedrich LLP

(57) ABSTRACT

A method and pulsed field ablation (PFA) system configured to provide variable impedance paths for delivery of electric fields to patient tissue using a PFA catheter are disclosed. According to one aspect, a method includes determining a current for each of a plurality of circuit paths, each circuit path including two electrodes. Each current may be determined based at least in part on: a desired voltage between the two electrodes; a tissue impedance between the two electrodes; and a parasitic impedance associated with the circuit path. The method also includes determining at least one of an excitation voltage and an input resistance for each circuit path of the plurality of circuit paths based at least in part on the determined current for the circuit path, parasitic impedances associated with the circuit path and a tissue impedance between the two electrodes in the circuit path.

26 Claims, 11 Drawing Sheets

(51) Int. Cl.
*H03H 1/00* (2006.01)
*A61B 18/00* (2006.01)

(52) U.S. Cl.
CPC ........... *A61B 2018/00577* (2013.01); *A61B 2018/0072* (2013.01); *A61B 2018/00732* (2013.01); *A61B 2018/00767* (2013.01); *A61B 2018/00875* (2013.01); *A61B 2018/1253* (2013.01); *A61B 2018/126* (2013.01); *A61B 2018/1407* (2013.01)

(56) References Cited

U.S. PATENT DOCUMENTS

| | | |
|---|---|---|
| 2016/0081739 A1 | 3/2016 | Heckel et al. |
| 2016/0287136 A1* | 10/2016 | Condie ............... A61B 5/6869 |
| 2016/0287137 A1 | 10/2016 | Condie et al. |
| 2020/0129089 A1 | 4/2020 | Gliner et al. |

* cited by examiner

VARIABLE IMPEDANCE PATHS FOR DELIVERY OF ELECTRIC FIELDS

CROSS-REFERENCE TO RELATED APPLICATION

This application claims the benefit of U.S. application Ser. No. 63/156,540 filed Mar. 4, 2021.

FIELD

The present technology is generally related to providing variable impedance paths for delivery of electric fields to patient tissue using a pulsed field ablation (PFA) system.

BACKGROUND

Electroporation is the application of an electric field to cells in order to increase the permeability of the cell membrane. Pulsed field ablation ("PFA") which can cause reversible or irreversible electroporation, is a non-thermal ablation technique that creates lesions in desired areas of patient tissue to treat conditions such as cardiac arrhythmias, and to ablate areas of tissues and/or organs in the body. For treating cardiac arrhythmias, for example, PFA can be performed to modify tissue, so as to stop aberrant electrical propagation and/or disrupt aberrant electrical conduction through cardiac tissue.

PFA includes application of short pulsed electric fields (PEF), which may reversibly or irreversibly destabilize cell membranes through electro-permeabilization, but generally do not affect the structural integrity of the tissue components, including the acellular cardiac extracellular matrix. The nature of PFA allows for very brief periods of therapeutic energy delivery, on the order of tens or hundreds of milliseconds in duration. Further, when targeting cardiomyocytes, PFA may not cause collateral damage to non-targeted tissue as frequently or as severely as thermal ablation techniques. Additionally, therapeutic agents may be preferentially introduced into the cells of targeted tissue that are exposed to a pulsed electric field (PEF) having reversible membrane permeabilization.

In some PFA systems, the user programs, or otherwise manually enters, the desired parameters of the pulsed electric field (PEF) delivered to the tissue may be input to an electrosurgical generator configured to deliver electrical energy to the target tissue through an electrosurgical hand piece. For a given delivery tool, target tissue, or environment, the user may select from waveform parameters such as the amplitude, size, shape, frequency, and repetition of the waveform. These parameters affect a size of the lesion caused by application of the PEF.

SUMMARY

The techniques of this disclosure generally relate to providing variable impedance paths for delivery of electric fields to patient tissue using a pulsed field ablation (PFA) system.

According to one aspect, a method is provided in a pulsed field ablation (PFA) system having a plurality of electrodes for delivering an electric field to patient tissue, a PFA generator for generating excitation voltages, and a catheter electrode distribution system (CEDS) configured to distribute the excitation voltages to the plurality of electrodes. The method includes determining a current for each of a plurality of circuit paths, each circuit path including two electrodes. Each current is determined based at least in part on: a desired voltage between the two electrodes; a tissue impedance between the two electrodes; and a parasitic impedance associated with the circuit path. The method also includes determining at least one of an excitation voltage and an input resistance for each circuit path of the plurality of circuit paths based at least in part on the determined current for the circuit path, parasitic impedances associated with the circuit path and a tissue impedance between the two electrodes in the circuit path.

According to this aspect, in some embodiments, the excitation voltages are determined by multiplying a vector of the determined currents by an impedance matrix, each non-zero element of the impedance matrix being based on at least one of the parasitic impedances. In some embodiments, non-zero elements of the impedance matrix include at least one input resistance, each input resistance to be placed in series with an excitation voltage applied to a circuit path of the plurality of circuit paths, the input resistances being determined by assuming excitation voltages, and solving for the input resistances from an equation that includes the assumed excitation voltages, the determined currents and the impedance matrix. In some embodiments, the desired voltages include bipolar electrode voltages. In some embodiments, the desired voltages include unipolar electrode voltages. In some embodiments, the parasitic impedances are determined by applying a signal to each circuit path of the plurality of circuit paths at a test frequency when the tissue impedance between the two electrodes is infinite. In some embodiments, the tissue impedance between two electrodes is determined by removing neutral electrode connections and all bipolar connections except for a tissue impedance between the two electrodes. In some embodiments, the method further includes determining a neutral electrode impedance for each circuit path of the plurality of circuit paths based at least in part on the parasitic impedances. In some embodiments, the method includes applying at least one determined excitation voltage to two electrodes of a circuit path to achieve a desired ablation. In some embodiments, the method includes applying the determined input resistance to achieve the desired voltage between the two electrodes of the circuit path to achieve a desired ablation.

According to another aspect, a PFA system is provided. The PFA system includes: a plurality of electrodes for delivering an electric field to patient tissue; a PFA generator for generating excitation voltages to be delivered to the plurality of electrodes; a catheter electrode distribution system (CEDS) configured to distribute the excitation voltages to the plurality of electrodes; and processing circuitry. The processing circuitry is configured to: determine a current for each of a plurality of circuit paths, each circuit path including two electrodes, each current being determined based at least in part on: a desired voltage between the two electrodes; a tissue impedance between the two electrodes; and a parasitic impedance associated with the circuit path. The processing circuitry is further configured to determine at least one of an excitation voltage and an input resistance for each circuit path of the plurality of circuit paths based at least in part on the determined current for the circuit path, parasitic impedances associated with the circuit path and a tissue impedance between the two electrodes in the circuit path.

According to this aspect, in some embodiments, the excitation voltages are determined by multiplying a vector of the determined currents by an impedance matrix, each non-zero element of the impedance matrix being based on at least one of the parasitic impedances. In some embodiments, non-zero elements of the impedance matrix include at least one input resistance, each input resistance to be placed in series with an excitation voltage applied to a circuit path of the plurality of circuit paths, the input resistances being determined by assuming excitation voltages, and solving for the input resistances from an equation that includes the assumed excitation voltages, the determined currents and the impedance matrix. In some embodiments, the desired voltages include bipolar electrode voltages. In some embodiments, the desired voltages include unipolar electrode voltages. In some embodiments, the parasitic impedances are determined by applying a signal to each circuit path of the plurality of circuit paths at a test frequency when the tissue impedance between the two electrodes is infinite. In some embodiments, the tissue impedance between two electrodes is determined by removing neutral electrode connections and all bipolar connections except for a tissue impedance between the two electrodes. In some embodiments, the processing circuitry is further configured to determine a neutral electrode impedance for each circuit path of the plurality of circuit paths based at least in part on the parasitic impedances. In some embodiments, the processing circuitry is further configured to apply at least one determined excitation voltage to two electrodes of a circuit path to achieve a desired ablation. In some embodiments, the processing circuitry is further configured to apply the determined input resistance to achieve the desired voltage between the two electrodes of the circuit path to achieve a desired ablation.

According to yet another aspect, a PFA system includes processing circuitry configured to determine a current for each of N circuit paths, each circuit path including two electrodes, N being an integer greater than 1. Each current is determined based at least in part on: a desired voltage between the two electrodes; a tissue impedance between the two electrodes; and a parasitic impedance associated with the circuit path. The processing circuitry is further configured to determine at least one of an excitation voltage and an input resistance for each circuit path of the N circuit paths based at least in part on the determined current for the circuit path, parasitic impedances associated with the circuit path and a tissue impedance between the two electrodes in the circuit path.

According to this aspect, in some embodiments, the excitation voltage for a circuit path of the N circuit paths is based at least in part on a sum of a parasitic impedance associated with the circuit path and a neutral electrode impedance associated with the circuit path. In some embodiments, the excitation voltage for a circuit path of the N circuit paths is a unipolar excitation voltage and the input resistance of the circuit path of the N circuit paths is determined based on the unipolar excitation voltage, the determined current, and a parasitic impedance associated with the circuit path. In some embodiments, the desired electrode voltages for the N circuit paths are not all equal.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Some embodiments provide variable impedance paths for delivery of electric fields to patient tissue using a pulsed field ablation (PFA) system.

A method and pulsed field ablation (PFA) system configured to provide variable impedance paths for delivery of electric fields to patient tissue using a PFA catheter are disclosed. According to one aspect, a method includes determining a current for each of a plurality of circuit paths, each circuit path including two electrodes. Each current may be determined based at least in part on: a desired voltage between the two electrodes; a tissue impedance between the two electrodes; and a parasitic impedance associated with the circuit path. The method also includes determining at least one of an excitation voltage and an input resistance for each circuit path of the plurality of circuit paths based at least in part on the determined current for the circuit path, parasitic impedances associated with the circuit path and a tissue impedance between the two electrodes in the circuit path.

Figure 1:
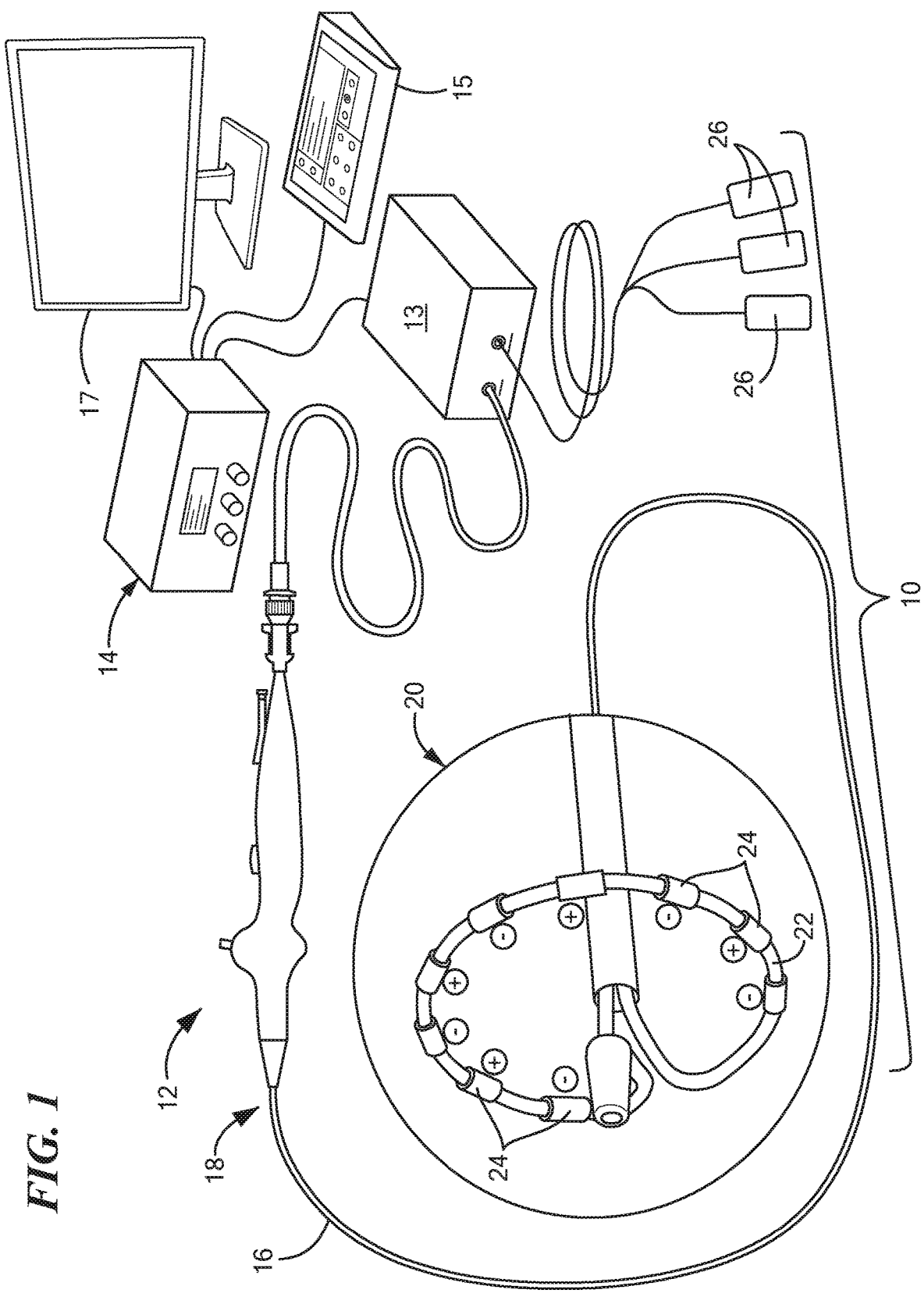
FIG. 1 illustrates a pulsed field ablation (PFA) system configured to achieve a desired voltage between two electrodes according to principles set forth herein.

Referring now to the drawings where like reference designators refer to like elements there is shown in FIG. 1 one example of a PFA system 10 configured to deliver electrical energy to irreversibly electroporate tissue. The PFA system 10 generally includes a medical device 12 that may be coupled directly to an energy supply, for example, a pulsed field ablation generator 14 which provides energy control, delivery and monitoring or indirectly through a catheter electrode distribution system (CEDS) 13. An input device 15 may further be included in communication with the generator for operating and controlling the various functions of the PFA generator 14. The medical device 12 may generally include one or more diagnostic or treatment regions for energetic, therapeutic and/or investigatory interaction between the medical device 12 and a treatment site. The PFA system 10 may deliver, for example, pulsed electroporation energy to a tissue area in proximity to the treatment region(s). The PFA system 10 may also include a display device 17 to display information to the user.

The medical device 12 may include an elongate body 16 passable through a patient's vasculature and/or position-able proximate to a tissue region for diagnosis or treatment, such as a catheter, sheath, or intravascular introducer. The elongate body 16 may define a proximal portion 18 and a distal portion 20, and may further include one or more lumens disposed within the elongate body 16 thereby providing mechanical, electrical, and/or fluid communication between the proximal portion of the elongate body 16 and the distal portion of the elongate body 16. The distal portion 20 may generally define the one or more treatment region(s) of the medical device 12 that are operable to monitor, diagnose, and/or treat a portion of a patient.

The treatment region(s) may have a variety of configurations to facilitate such operation. In the case of purely bipolar pulsed field delivery, distal portion 20 includes electrodes that form the bipolar configuration for energy delivery where energy passes between one or more electrodes and one or more different electrodes on the same electrode array. In an alternate configuration, a plurality of the electrodes 24 may serve as one pole while a second device containing one or more electrodes (not pictured) would be placed to serve as the opposing pole of the bipolar configuration. For example, as shown in FIG. 1, the distal portion 20 may include an electrode carrier arm 22 that is transition-able between a linear configuration and an expanded configuration in which the carrier arm 22 has an arcuate or substantially circular configuration. The electrode carrier arm 22 may include the plurality of electrodes 24 (for example, nine electrodes 24, as shown in FIG. 1) that are configured to deliver pulsed-field energy. Further, the electrode carrier arm 22 when in the expanded configuration may lie in a plane that is substantially orthogonal to the longitudinal axis of the elongate body 16. The planar orientation of the expanded electrode carrier arm 22 may facilitate ease of placement of the plurality of electrodes 24 in contact with the target tissue. Alternatively, the medical device 12 may be have a linear configuration with the plurality of electrodes 24. For example, the distal portion 20 may include nine electrodes 24 linearly disposed along a common longitudinal axis.

The PFA generator 14 may include processing circuitry including a processor in communication with one or more controllers and/or memories containing software modules containing instructions or algorithms to provide for the automated operation and performance of the features, sequences, calculations, or procedures described herein. The PFA system 10 may further include three or more surface ECG electrodes 26 on the patient in communication with the PFA generator 14 through the catheter electrode distribution system (CEDS) 13 to monitor the patient's cardiac activity for use in determining pulse train delivery timing at the desired portion of the cardiac cycle, for example, during the ventricular refractory period. In addition to monitoring, recording or otherwise conveying measurements or conditions within the medical device 12 or the ambient environment at the distal portion of the medical device 12, additional measurements may be made through connections to the multi-electrode catheter including for example temperature, electrode-tissue interface impedance, delivered charge, current, power, voltage, work, or the like in the PFA generator 14 and/or the medical device 12. The surface ECG electrodes 26 may be in communication with the PFA generator 14 for initiating or triggering one or more alerts or therapeutic deliveries during operation of the medical device 12. Additional neutral electrode patient ground patches (not pictured) may be employed to evaluate the desired bipolar electrical path impedance, as well as monitor and alert the operator upon detection of inappropriate and/or unsafe conditions. which include, for example, improper (either excessive or inadequate) delivery of charge, current, power, voltage and work performed by the plurality of electrodes 24; improper and/or excessive temperatures of the plurality of electrodes 24, improper electrode-tissue interface impedances; improper and/or inadvertent electrical connection to the patient prior to delivery of high voltage energy by delivering one or more low voltage test pulses to evaluate the integrity of the tissue electrical path.

The PFA generator 14 may include an electrical current or pulse generator having a plurality of output channels, with each channel coupled to an individual electrode of the plurality of electrodes 24 or multiple electrodes of the plurality of electrodes 24 of the medical device 12. The PFA generator 14 may be operable in one or more modes of operation, including for example: (i) bipolar energy delivery between at least two electrodes 24 or electrically-conductive portions of the medical device 12 within a patient's body, (ii) monopolar or unipolar energy delivery to one or more of the electrodes or electrically-conductive portions on the medical device 12 within a patient's body and through either a second device within the body (not shown) or a patient return or ground electrode (not shown) spaced apart from the plurality of electrodes 24 of the medical device 12, such as on a patient's skin or on an auxiliary device positioned within the patient away from the medical device 12, for example, and (iii) a combination of the monopolar and bipolar modes.

Figure 2:
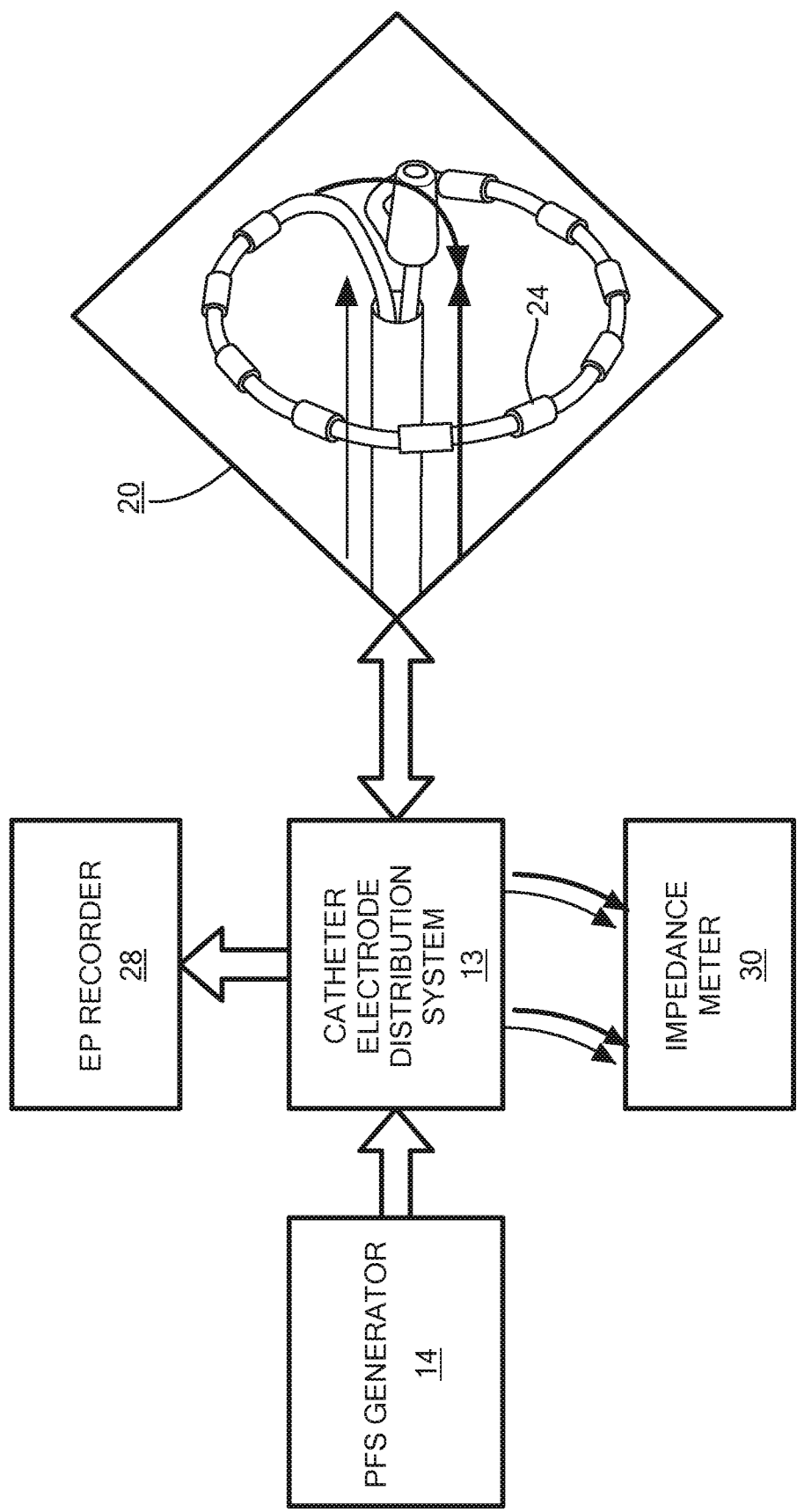
FIG. 2 is a block diagram of a PFA system configured to achieve a desired voltage between two electrodes according to principles set forth herein.

FIG. 2 is a block diagram of the PFA system 10 having the catheter electrode distribution system (CEDS) 13, the PFA generator 14, an electrophysiology (EP) recorder 28 and an impedance meter 30. During delivery of pulsed field energy via the electrodes 24, the CEDS 13 connects the electrodes 24 to the PFA generator 14. When energy is not being directed by the CEDS 13 to the electrodes 24, the CEDS 13 may be configured to display or record electrogram signals from the electrodes 24 to the EP recorder 28. The impedance meter 30 is configured to resolve impedances between electrodes 24, and optionally also resolve impedances between electrodes 24 and surface ECG electrodes 26.

Figure 3:
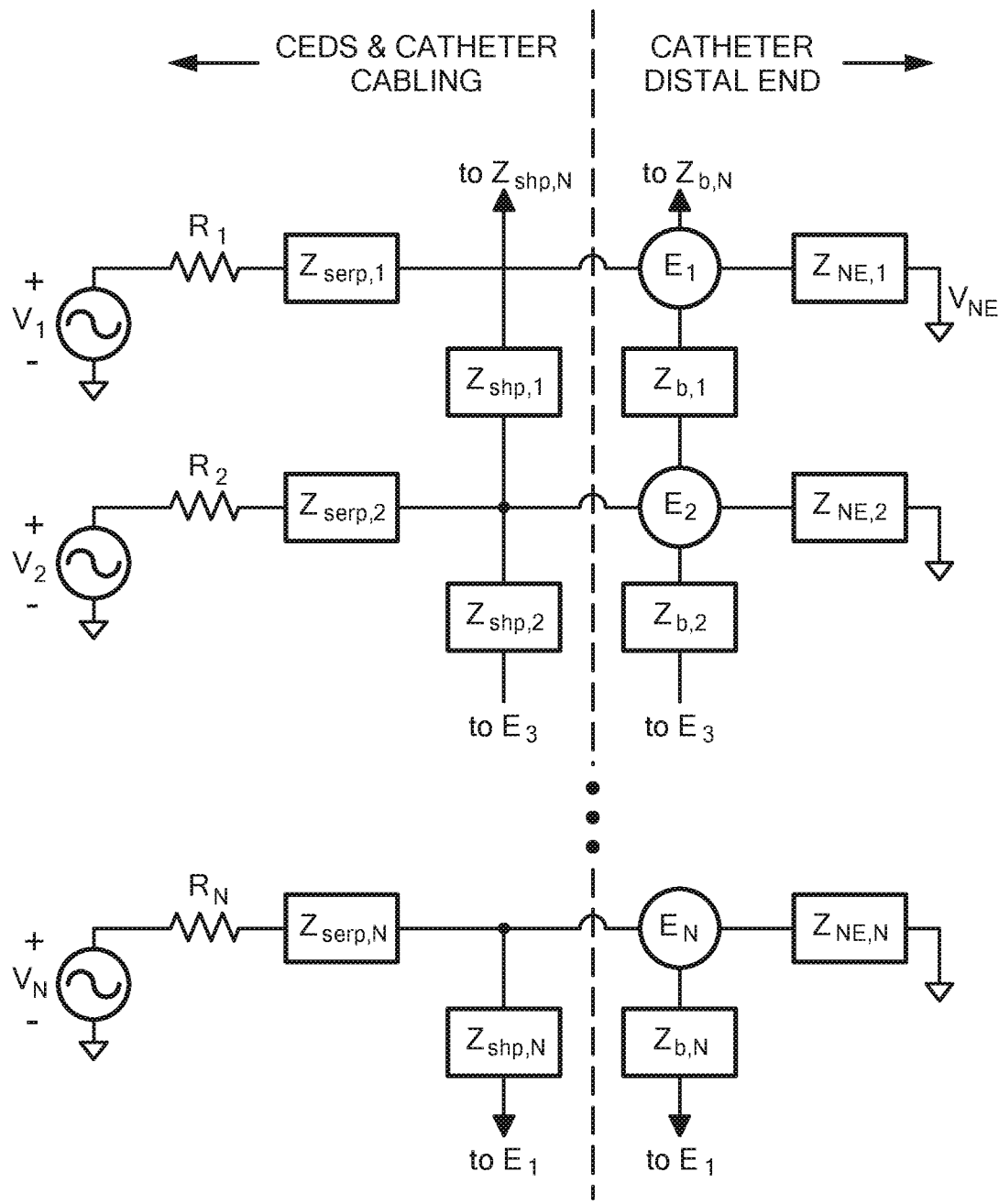
FIG. 3 is a circuit model of the PFA system of FIG. 2.

A schematic of an electrical model of the network that includes CEDS 13 and electrodes 24 is shown in FIG. 3. For an in situ catheter, there will be series and shunt impedances, Z, as shown in the topology of FIG. 3 for bipolar and unipolar modes. The in situ pulsed electric fields must obey a line integral (1) which enforces closed pathways, but provides for latitude in choosing convenient circuits:

$$V = \oint \vec{E} \cdot dl \tag{1}$$

Assuming an N electrode catheter, N being an integer greater than 1, the terms:

$R_1, R_2, \ldots R_N$ are known resistances used to passively attenuate an electrode's applied voltage and current relative to other catheter electrodes. The bipolar tissue impedances:

$Z_{b,1}, Z_{b,2}, \ldots Z_{b,N}$ are defined as nearest electrode neighbor coupling or bipolar impedance, which although arbitrary (other bipolar relations could be defined) the nearest-neighbor definition helps to simplify the measurement of terms in FIG. 3 and by extension, simplify the drive voltage solution that provides the desired electric field distribution among catheter electrodes.

If a neutral electrode (NE) connection is made to the patient, in addition to the bipolar impedances, the system will also include the following unipolar tissue impedances:

$$Z_{NE,1}, Z_{NE,2}, \ldots Z_{NE,N}$$

between each electrode and the NE. The system will also contain non-tissue related parasitic impedances that are undesirable but exist in the measuring apparatus, catheter external cable, handle and lumen. These impedances should be isolated from tissue impedances, as failing to extract them will render inaccurate tissue impedances. The parasitic terms:

$$Z_{serp,1}, Z_{serp,2}, \ldots Z_{serp,N}$$

are series components located in the catheter such as the lumen wire resistance and inductance.

The terms:

$$Z_{shp,1}, Z_{shp,2}, \ldots Z_{shp,N}$$

are shunt impedances due to coupling (normally capacitance) between catheter wires. To simplify the method herein, only the dominant, nearest-neighbor case of: $Z_{shp-n} = Z_{shp-n:n+1}$, shall be considered whereas other parasitic shunt couplings, $Z_{shp-m,n}$ require $(N^2-N)/2$ loop currents and measurements. For example, a 9 electrode catheter requires: $(9 \times 9 - 9)/2 = 36$ paths, currents and measurements. The $Z_{shp-m,n}$ terms may be included (and commensurate $(N^2-N)/2$ measurements made) if additional accuracy is required.

For a damaged or degraded catheter, the shunt term may also include resistance between lumen wires. In general, the relevant impedance measurement frequency will be proportional to the pulsed field ablation pulse width, where a range from 0.1 to 10 microseconds (us) is typical. For example, assuming a therapy pulse width of $T_{pw}=1$ us, the impedance evaluation frequency can be obtained by taking the Fourier transform of the trapezoidal-shaped therapy pulse, and noting the first Bode plot half-power point, which is proportional to the pulse width by:

$$f_{eval} = \frac{1}{\pi T_{pw}} = 318 \text{ KHz}$$

Catheter parasitic components may be identified by evaluating bipolar electrode pairs prior to deploying the catheter distal end in the cardio chamber. To enforce the assumption that tissue impedances, $Z_{bip-n:n+1}$, are negligible compared to parasitic bipolar impedances ($Z_{bip-n:n+1} >> Z_{shp-n:n+1}$), in the case of the manufacturing environment, the catheter distal end is placed in air while the sheath is placed in a saline medium that emulates blood conductivity and permittivity. The catheter parasitic impedances may also be evaluated at the time of a patient operation by sequestering distal electrodes in the catheter sheath prior to deployment of the distal end in the cardio chamber. A range of measurement frequencies, $0.2 < f_{test} < 4$ MHz, is useful for determining parasitic impedances.

Figure 4:
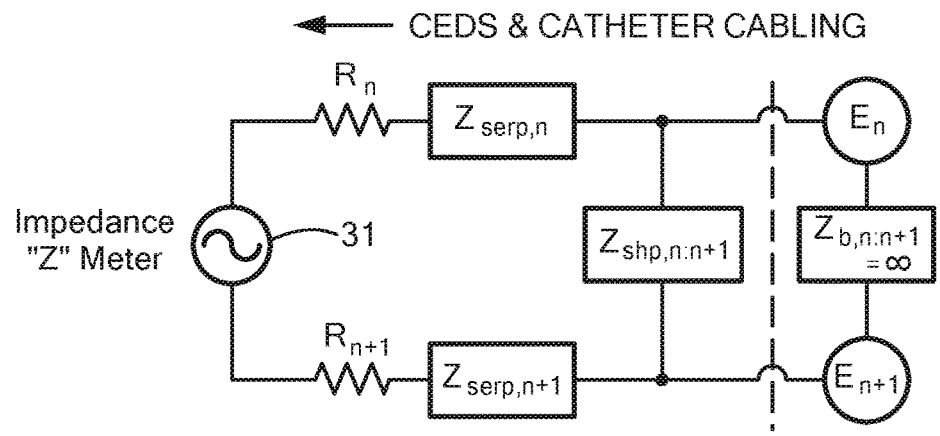
FIG. 4 is a circuit model for determining shunt and series parasitic impedances.

In FIG. 4, the dominant component in the shunt term, $Z_{shp-n:n+1}$, is capacitance between catheter wires in the cabling, which is on the order of 30 pico-Farads (pF)/ft, or 360 pF for a 6 ft catheter and 6 ft extension cable. In the $0.2 < f_{test} < 4$ MHz range, the capacitive reactance will be 2000 to 100 Ohms. Residual resistance can be attributed to the sum of catheter wire losses in the series parasitic components, $Z_{serp1}$ and $Z_{serp2}$, which are on the order of 10 ohms for each 38 gauge copper wire, a gauge typically used for catheter electrode wires. A difference in capacitance resolved between 0.2 MHz vs. 4 MHz would indicate series inductance, which could then be attributed to the $Z_{serp1}$ and $Z_{serp2}$ terms. Use of test frequencies less than 4 MHz will resolve extremely low and insignificant inductances because of the very small loop area in the catheter wire bundle. Given that a pulsed field waveform energy has relatively low frequency content ($F_{half-power} < 300$ KHz), resistance and capacitance are the dominant series and shunt parasitic components respectively in the PFA equipment—catheter therapy pathway.

Figure 5:
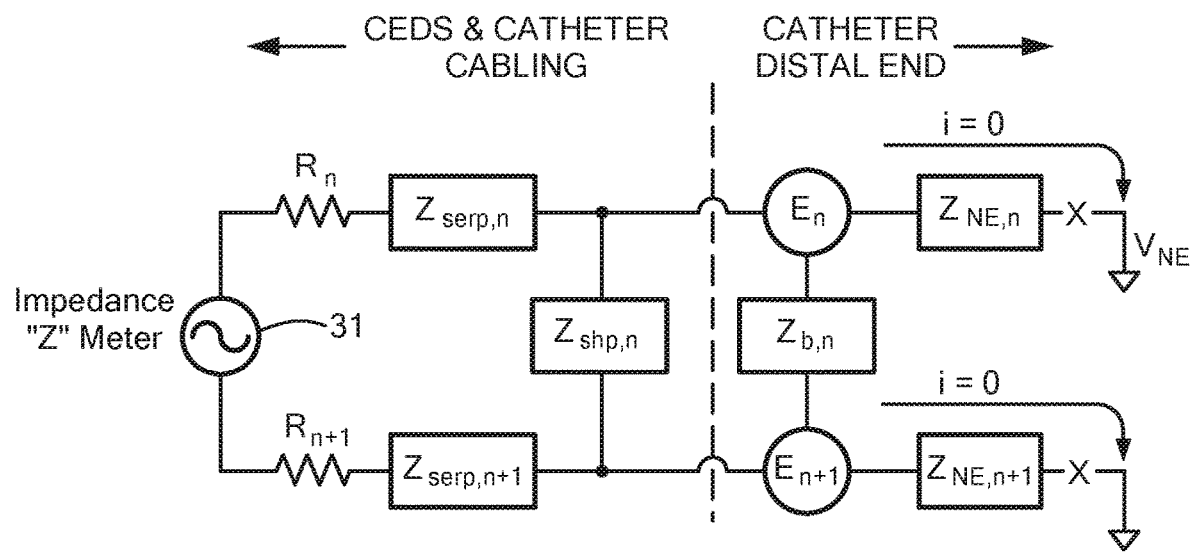
FIG. 5 is a circuit model for determining tissue impedances once the shunt and series parasitic impedances are determined.

Having determined the parasitic impedances, it is then possible to resolve the tissue impedances. With the catheter in situ, the bipolar tissue impedances may be found by removing all neutral electrode (NE) connections via CEDS relays, as well as all other bipolar connections except the for the tissue bipolar impedance between electrode n and n+1 as shown in FIG. 5

Figure 6:
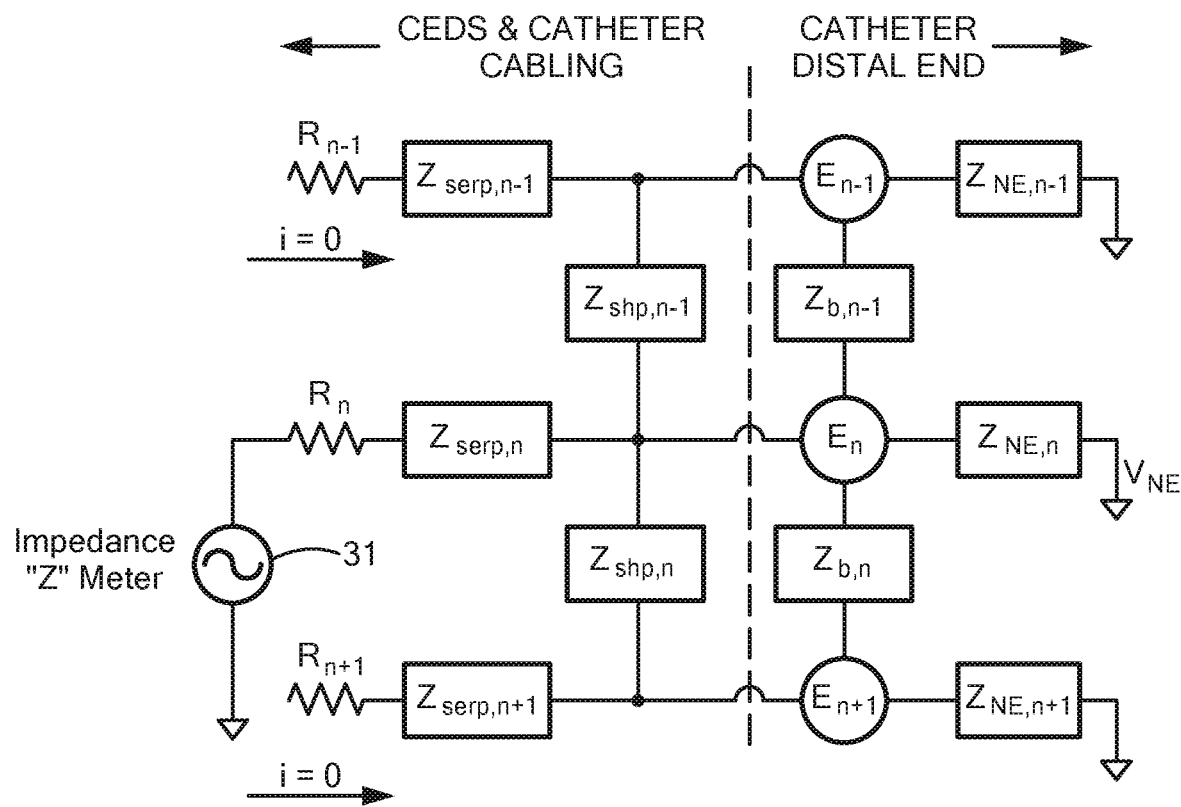
FIG. 6 is a circuit model for determining neutral electrode impedances once the shunt, series, and tissue impedances are determined.

Determination of the NE impedances presents an additional challenge due to the inability to decouple electrodes and break all but the desired current path to the NE as shown in FIG. 6.

The NE terms in FIG. 6 are found by noting the relation for each driven catheter wire (as all other wires are left open):

$$Z_n = Z_{serp_n} + Z_{NE_n} + \frac{1}{\sum_{m=1 \neq n}^{N} Y_{b_m - NE_m}} \quad (2)$$

where the admittance term is the inverse of the sum of adjacent path bipolar and NE impedances:

$$Y_{b_m - NE_m} = \frac{1}{Z_{b_{m:m+1}} + Z_{NE_{m+1}}} \quad (3)$$

By measuring impedance $Z_n$ for all N paths as shown in FIG. 6, there will be N $Z_n$ terms to balance the N unknown $Z_{NE-n}$ terms. Given that all other parasitic and in situ tissue impedance terms have been resolved in FIG. 3, it is then possible to solve for the final unknown unipolar terms, $Z_{NE-n}$. In FIGS. 4, 5 and 6, the impedance meter 31 can be implemented in hardware to measure the impedance looking into the circuit to the right of the impedance meter 31. The impedance meter 31 may determine the impedance at a plurality of different frequencies.

Bipolar Excitation of Catheter Electrodes via Active Method using Multiple Voltage Sources Having found all impedance terms in FIG. 3, it is possible to solve for the resistances and voltage sources that provide the desired electrode voltages in either bipolar or unipolar mode. Consider the active bipolar case shown in FIG. 7. To avoid adding additional currents to the linear set of equations in (4), the parasitic and tissue bipolar impedances have been combined to pass the loop currents, $I_n$.

Figure 7:
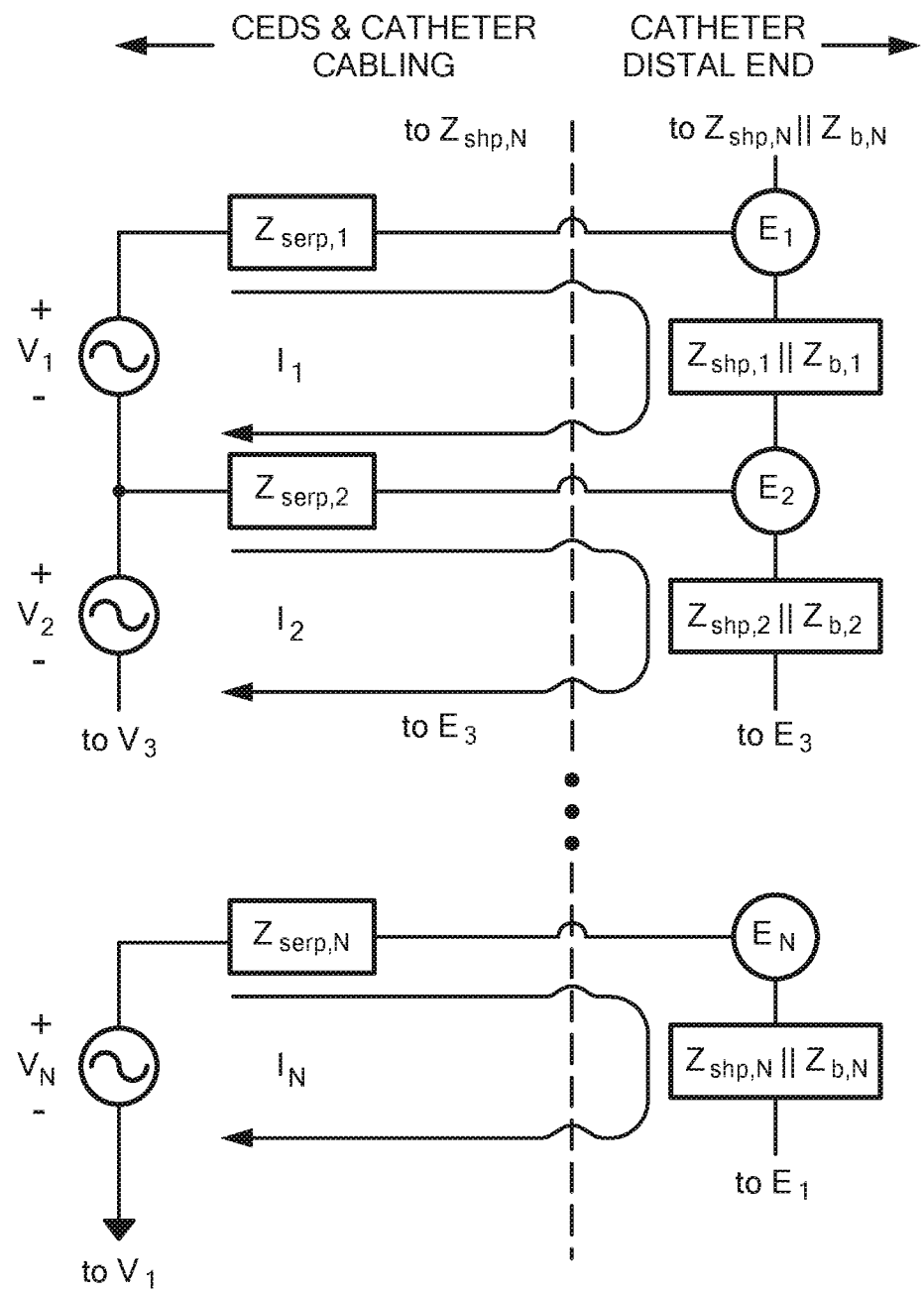
FIG. 7 is a circuit model for determining excitation voltages bipolar excitation of a plurality of electrodes when multiple excitation voltages are applied.

Having measured the impedance terms in FIG. 7, use Kirchoff's Voltage Law (KVL) around the loop currents $I_n$. This will generate bipolar electrode potentials according to (4):

$$\begin{bmatrix} V_1 \\ V_2 \\ \dots \\ V_N \end{bmatrix} = \begin{bmatrix} Z_{serp_1} + \dfrac{1}{Y_{shp_1}+Y_{b_1}} + Z_{serp_2}, & Z_{serp_2}, 0, \dots, 0, & & -Z_{serp_1} \\ -Z_{serp_2}, & Z_{serp_2} + \dfrac{1}{Y_{shp_2}+Y_{b_2}} + Z_{serp_3}, & -Z_{serp_3}, 0, \dots, 0 & \\ -Z_{serp_1}, 0, \dots, 0, & -Z_{serp_N}, & & Z_{serp_N} + \dfrac{1}{Y_{shp_N}+Y_{b_N}} + Z_{serp_1} \end{bmatrix} \begin{bmatrix} I_1 \\ I_2 \\ \dots \\ I_N \end{bmatrix} \quad (4)$$

Manipulation of (4) provides the means of solving for the desired excitation via the active voltage sources represented by the column vector, [$V_n$]. Given a desired voltage (or electric field distribution between electrodes if spacing is known), a current distribution, [$I_n$], is selected according to (5):

$$V_{E_n - E_{n+1}} = \frac{I_n}{Y_{shp_n} + Y_{b_n}} \quad (5)$$

which when multiplied by the [$Z_{N \times N}$] impedance matrix provides the desired power supply voltages, [$V_n$].

Figure 8:
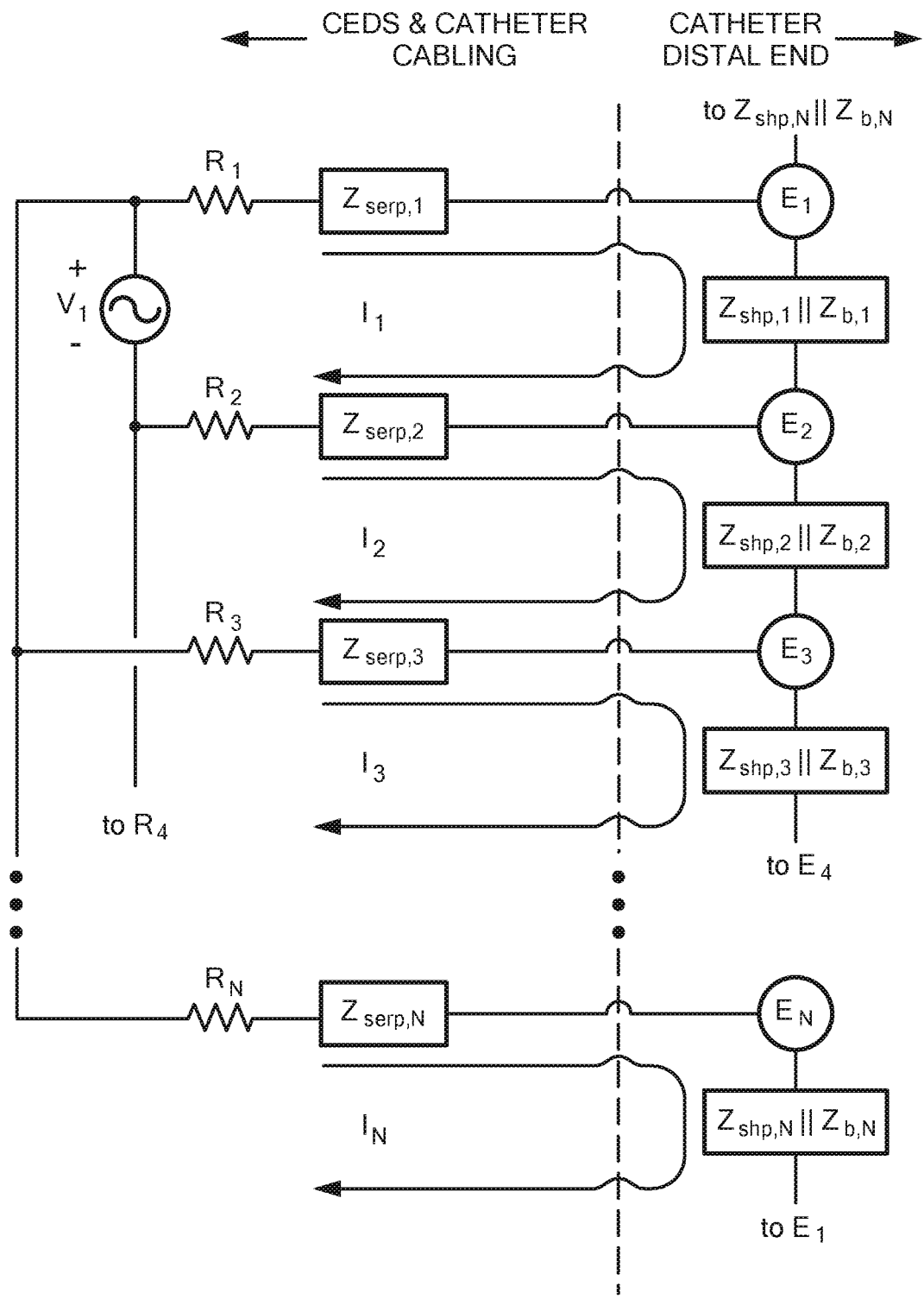
FIG. 8 is a circuit model for determining input resistances for bipolar excitation of a plurality of electrodes when a single excitation voltage is applied.

Bipolar Excitation of Catheter Electrodes via Passive Method using Single Voltage Source and Resistors Referring to FIG. 8, a passive method is used to set bipolar electrode voltages, $V_{E_n-E_{n+1}}$ using a single voltage source, V, connected to the CEDS 13 containing a resistor array, $R_n$. The advantage of the passive system is simplicity: only one source or H Bridge is required to generate waveform pulses, rather than the use of a separate H Bridge for each electrode pair. The resistor array can then be manipulated to set the catheter electrode array electric field distribution. While other polarities may be assigned, the voltage vector [$V_n$] in (6) is arbitrarily set to be bipolar with alternating polarities: V, −V, ... V. By inspection of FIG. 6, (4) is modified to include the resistors, $R_n$, and single voltage source, V, $$\begin{bmatrix} V \\ -V \\ \dots \\ V \end{bmatrix} = \begin{bmatrix} R_1 + Z_{serp_1} + \dfrac{1}{Y_{shp_1}+Y_{b_1}} + R_2 + Z_{serp_2}, & -(R_2+Z_{serp_2}), 0, \dots, 0, & -(R_1+Z_{serp_1}) \\ -(R_2+Z_{serp_2}), & R_2 + Z_{serp_2} + \dfrac{1}{Y_{shp_2}+Y_{b_2}} + R_3 + Z_{serp_3}, & -(R_3+Z_{serp_3}), 0, \dots, 0 \\ -(R_1+Z_{serp_1}), 0, \dots, 0, & -(R_N+Z_{serp_N}), & R_N + Z_{serp_N} + \dfrac{1}{Y_{shp_N}+Y_{b_N}} + R_1 + Z_{serp_1} \end{bmatrix} \begin{bmatrix} I_1 \\ I_2 \\ \dots \\ I_N \end{bmatrix} \quad (6)$$

First, the source voltage V, and bipolar electrode voltages, $V_{E_n-E_{n+1}}$ are specified for the desired therapy profile. Next, currents, $I_n$, are determined using (5). The linear set of equations in (6) are then manipulated to provide solution for the resistors, $R_n$.

Figure 9:
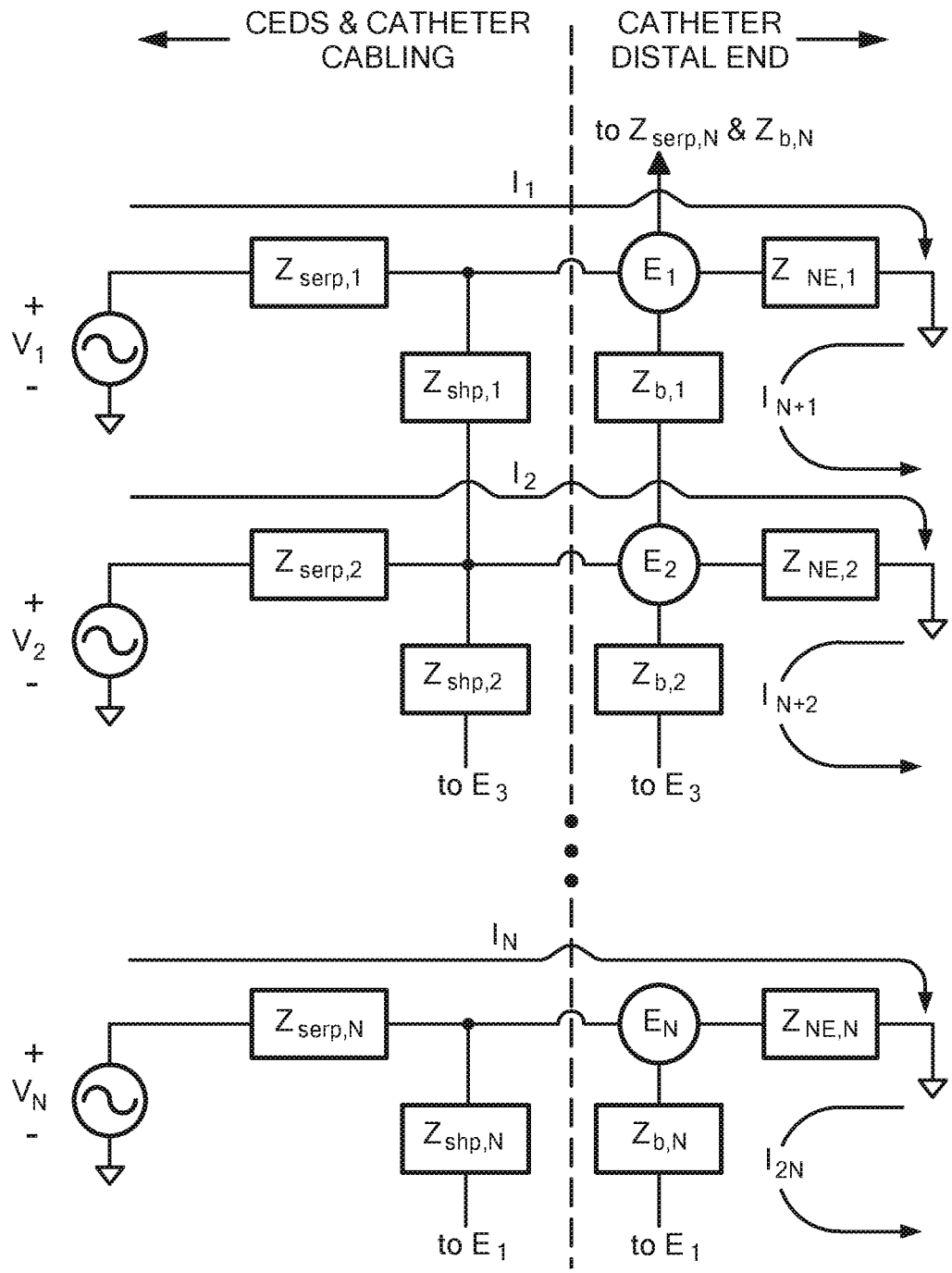
FIG. 9 is a circuit model for determining excitation voltages for unipolar excitation when multiple excitation voltages are applied.

Unipolar Excitation of Catheter Electrodes via Active Method using Multiple Voltage Sources Referring to the unipolar system driven with multiple voltage sources as shown in FIG. 9, there may be applied a desired set of excitation voltages [$V_n$], which may be different or may be the same. When all electrodes are at the same voltage, there will be no current flow between electrodes; therefore, the shunt currents between electrodes will be zero. In reviewing FIG. 9, enforcement of this condition implies that all electrode voltages with respect to the neutral electrode (NE), $V_{n:NE}$, will be equal. This means the following:

$$V_{n:NE} = I_1 Z_{NE1} = I_2 Z_{NE2} = \dots = I_N Z_{NE-N}. \quad (7)$$

Having determined the currents $I_n$, the source voltages are then found by:

$$V_n = I_n(Z_{ser-n} + Z_{NE-n}) \quad (8)$$

Other excitations where the electrode voltages with respect NE are unequal, or the condition:

$$V_{m:NE} \ne V_{n:NE} \quad (9)$$

will require solution of (10) where the second set of loop currents $I_{N+1}$ to $I_{2N}$ result in zero voltages, or $V_{N+1}$ to $V_{2N}=0$ as shown in the voltage source vector.

$$\begin{bmatrix} V_1 \\ V_2 \\ \dots \\ V_N \\ 0 \\ \dots \\ 0 \end{bmatrix} = \begin{bmatrix} Z_{serp_1}+Z_{NE_1} & 0,\dots, & 0 & 0 & 0,\dots, & 0 \\ 0 & Z_{serp_2}+Z_{NE_2}, 0, \dots, & 0 & 0 & 0,\dots, & 0 \\ 0 & 0,\dots, & Z_{serp_N}+Z_{NE_N} & 0 & 0,\dots, & 0 \\ 0 & 0,\dots, & 0 & Z_{NE_1} + \dfrac{1}{Y_{shp_1}+Y_{b_1}} + Z_{NE_2} & -Z_{NE_2}, \dots, & -Z_{NE_1} \\ 0 & 0,\dots, & 0 & -Z_{NE_2} & Z_{NE_2} + \dfrac{1}{Y_{shp_2}+Y_{b_2}} + Z_{NE_3}, -Z_{NE_3}, \dots, & 0 \\ 0 & 0,\dots, & 0 & -Z_{NE_1} & 0,\dots,-Z_{NE_N}, & Z_{NE_N} + \dfrac{1}{Y_{shp_N}+Y_{b_N}} + Z_{NE_1} \end{bmatrix} \begin{bmatrix} I_1 \\ I_2 \\ \dots \\ I_N \\ I_{N+1} \\ \dots \\ I_{2N} \end{bmatrix} \quad (10)$$

Figure 10:
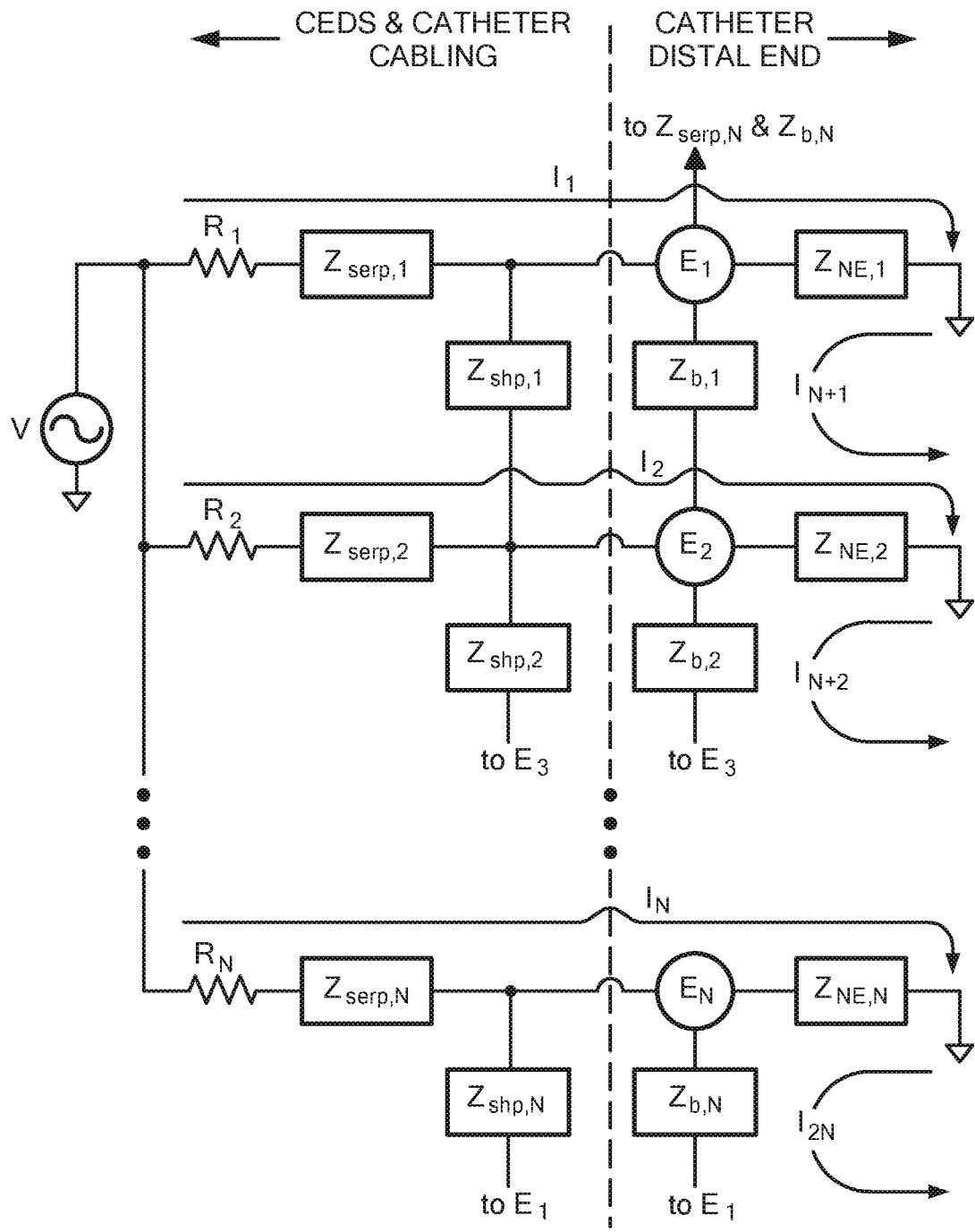
FIG. 10 is a circuit model for determining input resistances for unipolar excitation when a single excitation voltage is applied.

Unipolar Excitation of Catheter Electrodes via Passive Method using Single Voltage Source Referring to the unipolar system driven with a single voltage source shown in FIG. 10, in the active unipolar excitation mode, driving all electrodes at equal voltage is done by enforcement of equal electrode voltages with respect to the NE, $V_{n:NE}$ via equation (7).

Having chosen a source voltage V, and the currents $I_n$, that result in equal electrode voltages in (7), the $R_n$ are readily found by:

$$V_{n:NE} = V - I_n(R_n + Z_{ser-n}) \quad (11)$$

For other excitations where the electrode voltages with respect to its NE are unequal, (9) will require solution of (12) where the second set of loop currents $I_{N+1}$ to $I_{2N}$ result in zero voltages, or $V_{N+1}$ to $V_{2N}=0$ as shown in the voltage source vector.

$$\begin{bmatrix} V \\ V \\ \dots \\ V \\ 0 \\ \dots \\ 0 \end{bmatrix} = \begin{bmatrix} R_1 + Z_{serp_1} + Z_{NE_1} & 0, \dots, & 0 & 0 & 0, \dots, & 0 \\ 0 & R_2 + Z_{serp_2} + Z_{NE_2}, 0, \dots, & 0 & 0 & 0, \dots, & 0 \\ 0 & 0, \dots, & R_N + Z_{serp_N} + Z_{NE_N} & 0 & 0, \dots, & 0 \\ 0 & 0, \dots, & 0 & Z_{NE_1} + \frac{1}{Y_{shp_1} + Y_{b_1}} + Z_{NE_2} & -(R_2 + Z_{NE_2}), \dots, & -(R_1 + Z_{NE_1}) \\ 0 & 0, \dots, & 0 & -(R_2 + Z_{NE_2}) & Z_{NE_2} + \frac{1}{Y_{shp_2} + Y_{b_2}} + Z_{NE_3}, -(R_3 + Z_{NE_3}), \dots, & 0 \\ 0 & 0, \dots, & 0 & -(R_1 + Z_{NE_1}) & 0, \dots, -(R_N + Z_{NE_N}), & Z_{NE_N} + \frac{1}{Y_{shp_N} + Y_{b_N}} + Z_{NE_1} \end{bmatrix} \begin{bmatrix} I_1 \\ I_2 \\ \dots \\ I_N \\ I_{N+1} \\ \dots \\ I_{2N} \end{bmatrix} \quad (12)$$

Figure 11:
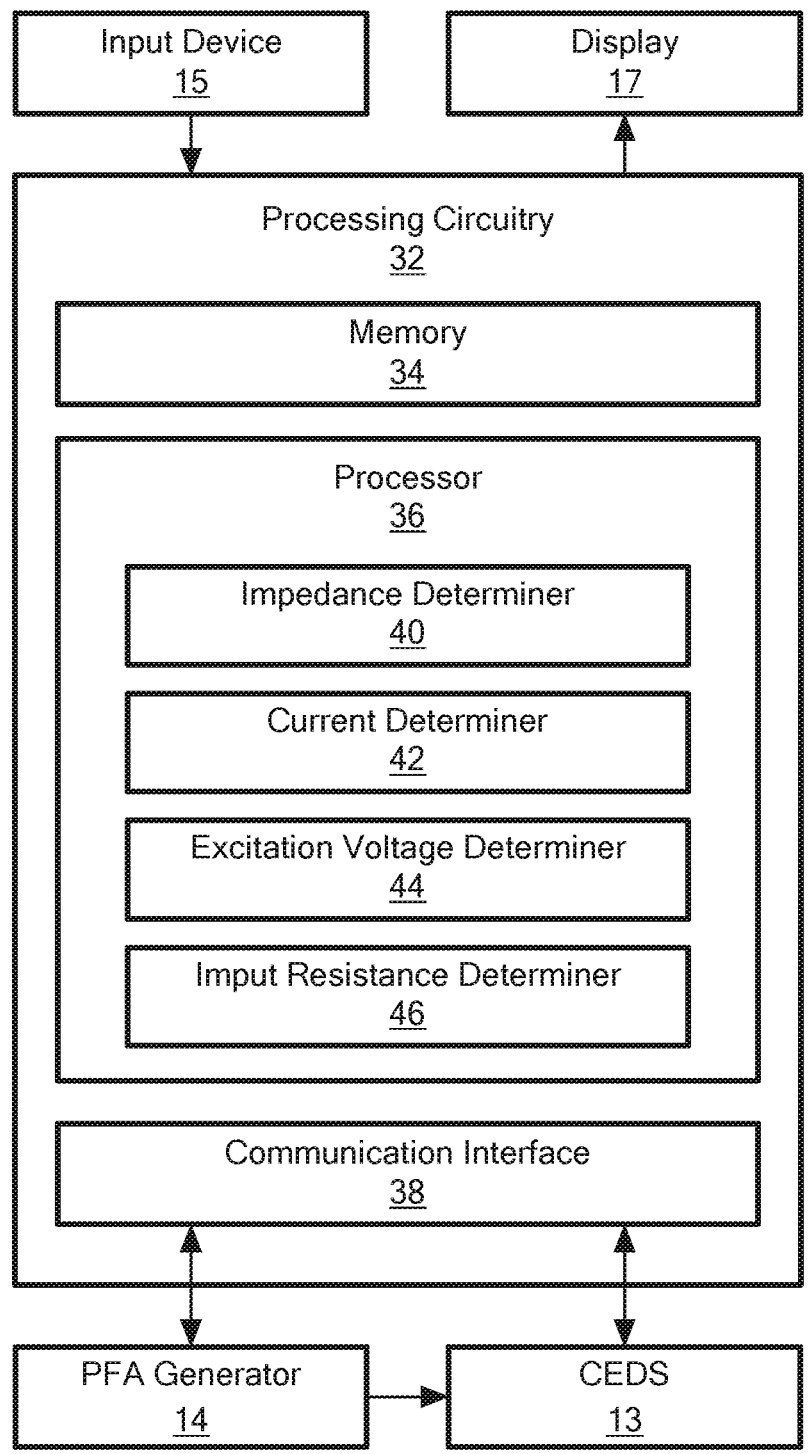
FIG. 11 is a block diagram of processing circuitry configured to implement functions described herein.

In some embodiments, one or more functions of one or more of the pulsed field ablation generator 14, the CEDS 13, and the input device 15, the EP recorder 28 and the impedance meter 30 may be implemented and performed by processing circuitry 32. FIG. 11 is a block diagram of the processing circuitry 32 for performing functions for providing variable impedance paths for delivery of electric fields to patient tissue using a pulsed field ablation (PFA) system 10. The processing circuitry 32 may include a memory 34 and a processor 36. The memory 34 may be configured to store computer program instructions that, when executed by the processor 36, cause the processor 36 to perform functions of the PFA system 10. The processing circuitry 32 may be implemented in whole or in part within the PFA generator 14 and/or within the CEDS 13, for example, or the processing circuitry 32 may be within a computer located separate from, and connected to, one or more of the PFA generator 14, and the CEDS 13, as shown in FIG. 11. One or more of such connections may be wireless or wireline. Thus, the processing circuitry 32 may have a communication interface 38 and one or more of the PFA generator 14 and/or the CEDS 13 may also have a communication interface configured to communicate with the communication interface 38 of the processing circuitry 32. The input device 15 may be a combination of a keyboard and a mouse, for example, and may be configured to allow a user to enter information such as one or more excitation voltages and one or more desired voltages. The display 17 may be a computer monitor, for example, and enables the user to observe information such as input resistances and impedance values. The display 17 may also display other information such as a visual indication of position and motion of the distal portion 20 of the PFA system 10.

The processor 36 may implement an impedance determiner 40 configured to determine parasitic impedances, tissue impedances, and neutral electrode impedances, a current determiner 42 configured to determine current in each of a plurality of circuit paths for a given desired potential difference between electrodes (which may be entered using the input device 15), an excitation voltage determiner 44 configured to determine excitation voltages based on the determined impedances, and an input resistance determiner 46 configured to determine an input resistance for each of a plurality of circuit paths that include two electrodes.

Figure 12:
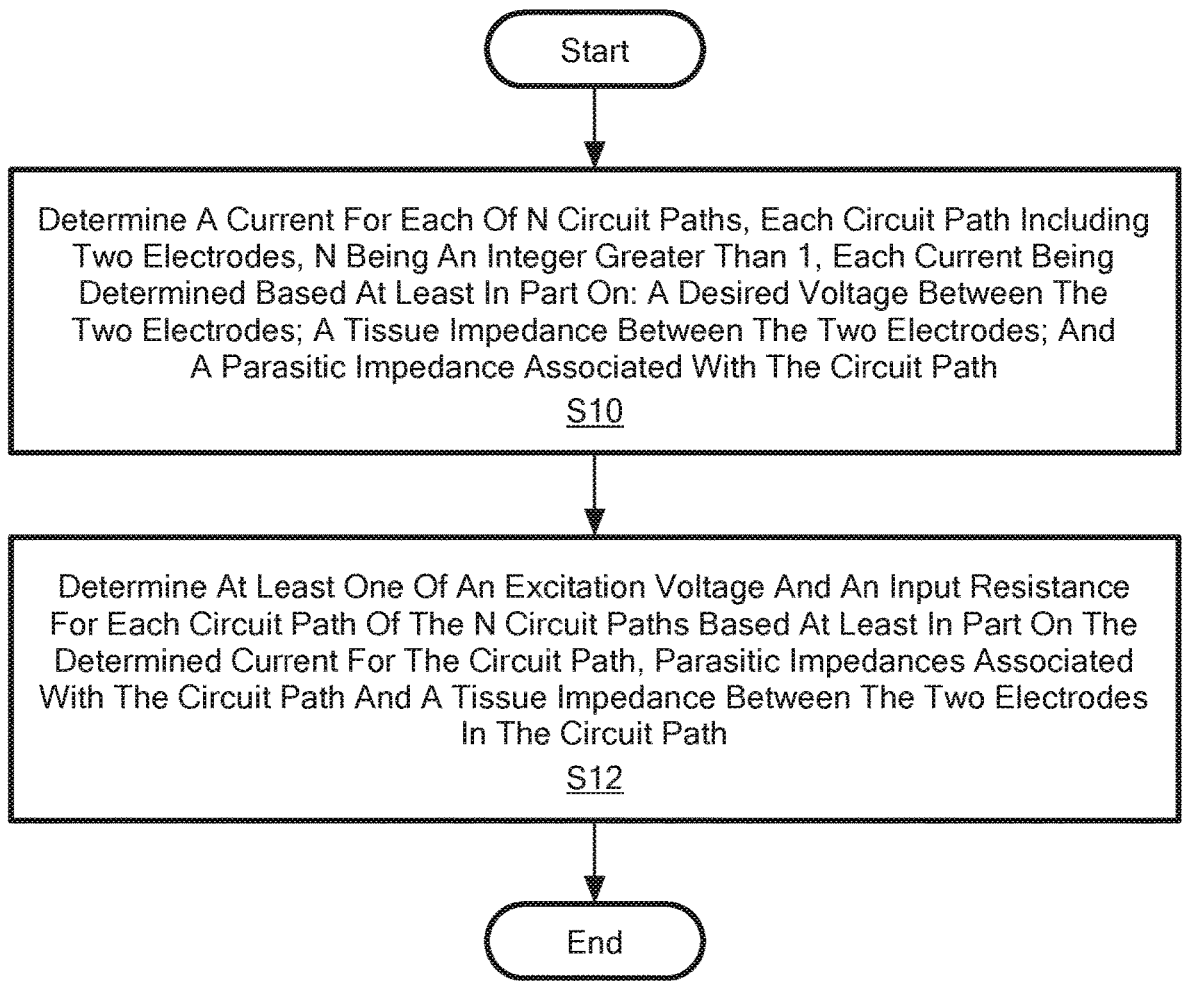
FIG. 12 is a flowchart of one example process for achieving desired voltages across electrodes.

FIG. 12 is a flowchart of one example process that may be performed by the processing circuitry 32. The process includes determining, via the current determiner 42, a current for each of N circuit paths, each circuit path including two electrodes, N being an integer greater than 1, each current being determined based at least in part on: a desired voltage between the two electrodes; a tissue impedance between the two electrodes; and a parasitic impedance associated with the circuit path (Block S10). The process may also include determining at least one of an excitation voltage, via excitation voltage determiner 44, and an input resistance, via input resistance determiner 46, for each circuit path of the N circuit paths based at least in part on the determined current for the circuit path, parasitic impedances associated with the circuit path and a tissue impedance between the two electrodes in the circuit path (Block S12).

According to one aspect, a method is provided in a pulsed field ablation (PFA) system 10 having a plurality of electrodes 24 for delivering an electric field to patient tissue, a PFA generator 14 for generating excitation voltages, and a catheter electrode distribution system (CEDS) 13 configured to distribute the excitation voltages to the plurality of electrodes 24. The method includes determining, via the current determiner 42, a current for each of a plurality of circuit paths, each circuit path including two electrodes. Each current is determined based at least in part on: a desired voltage between the two electrodes 24; a tissue impedance between the two electrodes 24; and a parasitic impedance associated with the circuit path. The method also includes determining, via the excitation voltage determiner 44 and/or the input resistance determiner 46, at least one of an excitation voltage and an input resistance for each circuit path of the plurality of circuit paths based at least in part on the determined current for the circuit path, parasitic impedances associated with the circuit path and a tissue impedance between the two electrodes in the circuit path.

According to this aspect, in some embodiments, the excitation voltages are determined by multiplying a vector of the determined currents by an impedance matrix, each non-zero element of the impedance matrix being based on at least one of the parasitic impedances. In some embodiments, non-zero elements of the impedance matrix include at least one input resistance, each input resistance to be placed in series with an excitation voltage applied to a circuit path of the plurality of circuit paths, the input resistances being determined by assuming excitation voltages, and solving for the input resistances from an equation that includes the assumed excitation voltages, the determined currents and the impedance matrix. In some embodiments, the desired voltages include bipolar electrode voltages. In some embodiments, the desired voltages include unipolar electrode voltages. In some embodiments, the parasitic impedances are determined by applying a signal to each circuit path of the plurality of circuit paths at a test frequency when the tissue impedance between the two electrodes is infinite. In some embodiments, the tissue impedance between two electrodes is determined by removing neutral electrode connections and all bipolar connections except for a tissue impedance between the two electrodes. In some embodiments, the method further includes determining a neutral electrode impedance for each circuit path of the plurality of circuit paths based at least in part on the parasitic impedances. In some embodiments, the method includes applying at least one determined excitation voltage to two electrodes of a circuit path to achieve a desired ablation. In some embodiments, the method includes applying the determined input resistance to achieve the desired voltage between the two electrodes of the circuit path to achieve a desired ablation.

According to another aspect, a PFA system 10 is provided. The PFA system 10 includes: a plurality of electrodes 24 for delivering an electric field to patient tissue; a PFA generator 14 for generating excitation voltages to be delivered to the plurality of electrodes 24; a catheter electrode distribution system (CEDS) 13 configured to distribute the excitation voltages to the plurality of electrodes 24; and processing circuitry 32. The processing circuitry 32 is configured to: determine a current for each of a plurality of circuit paths, each circuit path including two electrodes 24, each current being determined based at least in part on: a desired voltage between the two electrodes 24; a tissue impedance between the two electrodes; and a parasitic impedance associated with the circuit path. The processing circuitry 32 is further configured to determine at least one of an excitation voltage and an input resistance for each circuit path of the plurality of circuit paths based at least in part on the determined current for the circuit path, parasitic impedances associated with the circuit path and a tissue impedance between the two electrodes 24 in the circuit path.

According to this aspect, in some embodiments, the excitation voltages are determined by multiplying a vector of the determined currents by an impedance matrix, each non-zero element of the impedance matrix being based on at least one of the parasitic impedances. In some embodiments, non-zero elements of the impedance matrix include at least one input resistance, each input resistance to be placed in series with an excitation voltage applied to a circuit path of the plurality of circuit paths, the input resistances being determined by assuming excitation voltages, and solving for the input resistances from an equation that includes the assumed excitation voltages, the determined currents and the impedance matrix. In some embodiments, the desired voltages include bipolar electrode voltages. In some embodiments, the desired voltages include unipolar electrode voltages. In some embodiments, the parasitic impedances are determined by applying a signal to each circuit path of the plurality of circuit paths at a test frequency when the tissue impedance between the two electrodes is infinite. In some embodiments, the tissue impedance between two electrodes is determined by removing neutral electrode connections and all bipolar connections except for a tissue impedance between the two electrodes. In some embodiments, the processing circuitry 32 is further configured to determine a neutral electrode impedance for each circuit path of the plurality of circuit paths based at least in part on the parasitic impedances. In some embodiments, the processing circuitry is further configured to apply at least one determined excitation voltage to two electrodes of a circuit path to achieve a desired ablation. In some embodiments, the processing circuitry is further configured to apply the determined input resistance to achieve the desired voltage between the two electrodes of the circuit path to achieve a desired ablation.

According to yet another aspect, a PFA system 10 includes processing circuitry 32 configured to determine a current for each of N circuit paths, each circuit path including two electrodes 24, N being an integer greater than 1. Each current is determined based at least in part on: a desired voltage between the two electrodes; 24 a tissue impedance between the two electrodes 24; and a parasitic impedance associated with the circuit path. The processing circuitry 32 is further configured to determine at least one of an excitation voltage and an input resistance for each circuit path of the N circuit paths based at least in part on the determined current for the circuit path, parasitic impedances associated with the circuit path and a tissue impedance between the two electrodes in the circuit path.

According to this aspect, in some embodiments, the excitation voltage for a circuit path of the N circuit paths is based at least in part on a sum of a parasitic impedance associated with the circuit path and a neutral electrode impedance associated with the circuit path. In some embodiments, the excitation voltage for a circuit path of the N circuit paths is a unipolar excitation voltage and the input resistance of the circuit path of the N circuit paths is determined based on the unipolar excitation voltage, the determined current, and a parasitic impedance associated with the circuit path. In some embodiments, the desired electrode voltages for the N circuit paths are not all equal.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a pulsed field ablation (PFA) system having a plurality of electrodes for delivering an electric field to patient tissue, a PFA generator for generating excitation voltages, and a catheter electrode distribution system (CEDS) configured to distribute the excitation voltages to the plurality of electrodes, the method comprising:
   determining a current for each of a plurality of circuit paths, each circuit path including two electrodes, each current being determined based at least in part on:
      a desired voltage between the two electrodes;
      a tissue impedance between the two electrodes; and
      a parasitic impedance associated with the circuit path; and
   determining an excitation voltage and an input resistance for each circuit path of the plurality of circuit paths based on the determined current for the circuit path, parasitic impedances associated with the circuit path, and a tissue impedance between the two electrodes in the circuit path.

2. The method of claim 1, wherein the excitation voltages are determined by multiplying a vector of the determined currents by an impedance matrix, each non-zero element of the impedance matrix being based on at least one of the parasitic impedances.

3. The method of claim 2, wherein non-zero elements of the impedance matrix include at least one input resistance, each input resistance located on a respective circuit path of the plurality of circuit paths that receives an excitation voltage, the input resistances being determined by assuming excitation voltages, and solving for the input resistances from an equation that includes the assumed excitation voltages, the determined currents and the impedance matrix.

4. The method of claim 1, wherein the desired voltages include bipolar electrode voltages.

5. The method of claim 1, wherein the desired voltages include unipolar electrode voltages.

6. The method of claim 1, wherein the parasitic impedances are determined by applying a signal to each circuit path of the plurality of circuit paths at a test frequency when the tissue impedance between the two electrodes is infinite.

7. The method of claim 1, wherein the tissue impedance between two electrodes is determined by removing neutral electrode connections and all bipolar connections except for a tissue impedance between the two electrodes.

8. The method of claim 1, further comprising determining a neutral electrode impedance for each circuit path of the plurality of circuit paths based at least in part on the parasitic impedances.

9. The method of claim 1, further comprising applying at least one determined excitation voltage to two electrodes of a circuit path to achieve a desired ablation.

10. The method of claim 9, further comprising applying the determined input resistance to achieve the desired voltage between the two electrodes of the circuit path to achieve a desired ablation.

11. The method of claim 1, further comprising applying the determined input resistance to achieve a desired voltage between two electrodes of a circuit path to achieve a desired ablation.

12. A pulsed field ablation (PFA) system, comprising:
   a plurality of electrodes for delivering an electric field to patient tissue;
   a PFA generator for generating excitation voltages to be delivered to the plurality of electrodes;
   a catheter electrode distribution system (CEDS) configured to distribute the excitation voltages to the plurality of electrodes; and
   processing circuitry configured to:
      determine a current for each of a plurality of circuit paths, each circuit path including two electrodes, each current being determined based at least in part on:
         a desired voltage between the two electrodes;
         a tissue impedance between the two electrodes; and
         a parasitic impedance associated with the circuit path; and
      determine of an excitation voltage and an input resistance for each circuit path of the plurality of circuit paths based on the determined current for the circuit path, parasitic impedances associated with the circuit path, and a tissue impedance between the two electrodes in the circuit path.

13. The PFA system of claim 12, wherein the excitation voltages are determined by multiplying a vector of the determined currents by an impedance matrix, each non-zero element of the impedance matrix being based on at least one of the parasitic impedances.

14. The PFA system of claim 13, wherein non-zero elements of the impedance matrix include at least one input resistance, each input resistance located on a respective circuit path of the plurality of circuit paths that receives an excitation voltage, the input resistances being determined by assuming excitation voltages, and solving for the input resistances from an equation that includes the assumed excitation voltages, the determined currents and the impedance matrix.

15. The PFA system of claim 12, wherein the desired voltages include bipolar electrode voltages.

16. The PFA system of claim 12, wherein the desired voltages include unipolar electrode voltages.

17. The PFA system of claim 12, wherein the parasitic impedances are determined by applying a signal to each circuit path of the plurality of circuit paths at a test frequency when the tissue impedance between the two electrodes is infinite.

18. The PFA system of claim 12, wherein the tissue impedance between two electrodes is determined by removing neutral electrode connections and all bipolar connections except for a tissue impedance between the two electrodes.

19. The PFA system of claim 12, wherein the processing circuitry is further configured to determine a neutral electrode impedance for each circuit path of the plurality of circuit paths based at least in part on the parasitic impedances.

20. The PFA system of claim 12, wherein the processing circuitry is further configured to apply at least one determined excitation voltage to two electrodes of a circuit path to achieve a desired ablation.

21. The PFA system of claim 20, wherein the processing circuitry is further configured to apply the determined input resistance to achieve the desired voltage between the two electrodes of the circuit path to achieve a desired ablation.

22. The PFA system of claim 12, wherein the processing circuitry is further configured to apply the determined input resistance to achieve a desired voltage between two electrodes of a circuit path to achieve a desired ablation.

23. A pulsed field ablation (PFA) system, comprising processing circuitry configured to:

determine a current for each of N circuit paths, each circuit path including two electrodes, N being an integer greater than 1, each current being determined based on:
  a desired voltage between the two electrodes;
  a tissue impedance between the two electrodes; and
  a parasitic impedance associated with the circuit path; and determine an excitation voltage and an input resistance for each circuit path of the N circuit paths based on the determined current for the circuit path, parasitic impedances associated with the circuit path, and a tissue impedance between the two electrodes in the circuit path.

24. The PFA system of claim 23, wherein the excitation voltage for a circuit path of the N circuit paths is based at least in part on a sum of a parasitic impedance associated with the circuit path and a neutral electrode impedance associated with the circuit path.

25. The PFA system of claim 23, wherein the excitation voltage for a circuit path of the N circuit paths is a unipolar excitation voltage and the input resistance of the circuit path of the N circuit paths is determined based on the unipolar excitation voltage, the determined current, and a parasitic impedance associated with the circuit path.

26. The PFA system of claim 23, wherein the desired electrode voltages for the N circuit paths are not all equal.

* * * * *